United States Patent [19]

McConnell et al.

[11] Patent Number: 4,828,211
[45] Date of Patent: May 9, 1989

[54] FOLDABLE SUPPORT FOR BEVERAGE CONTAINER

[75] Inventors: Dale McConnell, Holland; Steven R. Isenga, Zeeland, both of Mich.

[73] Assignee: ITC, Incorporated, Zeeland, Mich.

[21] Appl. No.: 187,506

[22] Filed: Apr. 28, 1988

[51] Int. Cl.[4] .............................................. A47K 1/09
[52] U.S. Cl. .................................... 248/311.2; 211/75; 248/313; 248/316.4; 297/188; D6/535; D7/70
[58] Field of Search ................. 211/74, 75; 248/311.2, 248/316.4, 313; 297/194, 188; D7/70; D6/512, 535; 224/273, 274

[56] References Cited

U.S. PATENT DOCUMENTS

| | | | |
|---|---|---|---|
| 1,049,402 | 1/1913 | Rydberg | 248/316.4 X |
| 1,954,269 | 4/1934 | Slowig | 248/311.2 X |
| 2,453,207 | 11/1948 | Dunn | 248/316.4 X |
| 2,631,346 | 3/1953 | Wengen et al. | 248/316.4 X |
| 2,754,078 | 7/1956 | Koger et al. | D7/70 X |
| 3,233,858 | 2/1966 | Benjamin | D7/70 X |
| 3,268,196 | 8/1966 | Anton, Sr. | 248/316.4 X |
| 4,511,072 | 4/1985 | Owens | D7/70 X |

FOREIGN PATENT DOCUMENTS

| | | | |
|---|---|---|---|
| 736565 | 9/1932 | France | 248/316.4 |
| 18882 | of 1902 | United Kingdom | 248/316.4 |

Primary Examiner—Alvin C. Chin-Shue
Assistant Examiner—David L. Talbott
Attorney, Agent, or Firm—Price, Heneveld, Cooper, DeWitt & Litton

[57] ABSTRACT

A holder for containers, such as pop cans, beverage cups and the like has a back panel designed to be mounted on generally vertical support. The holder at its lower end has a base member to seat the bottom of the container and at its upper end a pair of arms designed to embrace and hold the container. The arms are supported on a track for independent sliding movement to provide adjustment of the size of the opening between the arms. Detent means provide resistance to the sliding movement at various increments of spacing between the arms.

13 Claims, 2 Drawing Sheets

FOLDABLE SUPPORT FOR BEVERAGE CONTAINER

FIELD OF THE INVENTION

The invention is a bracket for holding items, such as a can or glass, in such a manner that it can be readily removed but will not be displaced by the fact that the vehicle or vessel on which it is supported is subject to fore and aft or sideways rocking motion and the support includes means whereby the container's support is adjustable to accommodate and firmly support containers of a variety of sizes.

BACKGROUND OF THE INVENTION

It has for some time been standard practice to provide holders for beverage containers, such as cans, glasses or bottles, that can be mounted on the sides or walls of a vessel and are so designed that they will positively hold the can or other container with sufficient certainty that motion of the structure on which the holder is mounted will not cause the container to be released. It has been known to make these devices in a manner such that they have a back panel which is positively secured to a generally vertical wall of the vessel on which they are mounted and a collar device or clamping means which is pivotally mounted to the back panel for movement between a storage position parallel to the back panel and an erected position in which it extends substantially horizontal or at right angles to the back panel. It is also well-known to make the container clamping means pivotal between a storage position parallel to the back panel and an erected position normal to the back panel. It is also known to provide such a support with a cover which is pivotally secured to the lower end of the back panel and in erected position provides a base support for the can, bottle or glass and in storage position seats over the folded clamp member and covers it and the back panel. The problem with these devices has been that they are limited to containers of a single size whereas various types of beverages are merchandised in containers of various sizes. Further, should it be desired to use the device for holding a different type of liquid container, such as a coffee cup, the clamp member having an opening of a fixed size is incapable of use with many cups and similar beverage holders.

BRIEF DESCRIPTION OF THE INVENTION

The invention provides a device of this type in which the clamp has a pair of independent arms the spacing between which can be adjusted so that the device can be made to accommodate containers of a variety of sizes without sacrificing the ability of the device when not in use being folded together as a compact unit and stored in the same manner as the holders presently available on the market. This objective is obtained by means which are both simple and relatively inexpensive to manufacture and are positive and effective in use. The invention provides a clamping member or holder which has a pair of independent arms each of which may be moved laterally independently of the other to any one of several selected positions thereby making it possible to adjust the size of the opening between the arms to accommodate the beverage container and, at the same time, positively support the container against unwanted forward or sideways rocking motion with respect to the device which is supporting it.

DESCRIPTION OF THE PREFERRED EMBODIMENT

Figure 1:
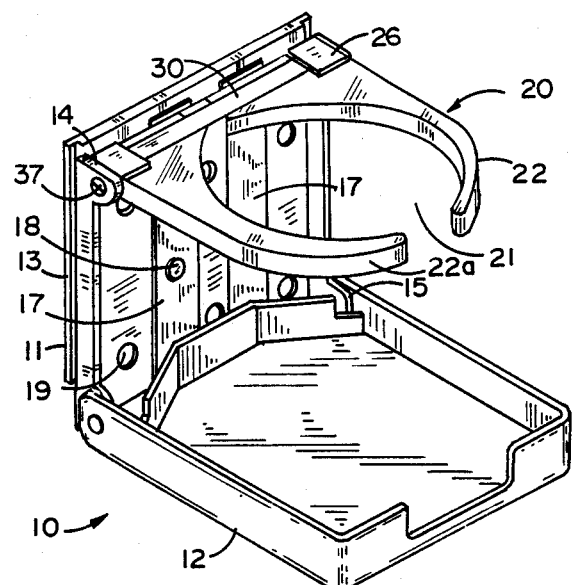
FIG. 1 is an oblique view of a beverage container holder incorporating this invention.
Figure 13:
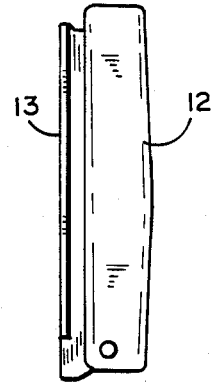
FIG. 13 is a view similar to FIG. 12 with the cover closed.

Referring to FIG. 1, the numeral 10 identifies a housing having a back panel 11 and a cover 12 which, in the position illustrated, serves as a base or support panel. The back panel has sides 13 having upper ears 14 and lower ears 15. The sides and the ears extend forwardly. The lower ears 15 provide means by which the base or cover panel 12 is pivotally connected to the back panel 11 by means of hinge pins 16. A clamp member is pivotally supported on the upper ears 14 whereby it may be pivoted from an erected position normal to the back panel 11 and a retracted or storage position parallel to the back panel 11 and can be concealed behind the base panel when the latter is folded upwardly to enclose the front of the support together with the retracted clamp 20 as illustrated in FIG. 13. The back panel also has a pair of vertical spring elements 17 mounted on it, the upper and lower ends of which serve to hold the clamp member 20 and the base panel 12, respectively, in either their open or their closed positions. The spring members are each secured to the back panel by suitable means such as the connector 18. The back panel is designed to be secured to a vertical supporting surface such as the side of a boat by suitable means such as screws inserted through the openings 19. All of the structure which has been described up to this point is well-known and has been commercially available for some time. In the commercially available beverage container supports, the clamp 20 is a unitary structure, the container opening 21 of which is fixed and, thus, cannot be adjusted to accommodate containers of varying sizes. It is a solution to the problem, that this arrangement creates, that is provided by this invention.

Figure 8:
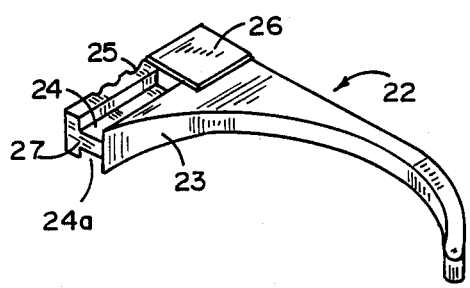
FIG. 8 is an oblique, top view of one of the clamp arms.

In this invention, the clamp 20, instead of being a unitary structure consists of a pair of individual arms 22 and 22a. These arms are identical except that one is left and the other is right. Each of the arms has a yoke portion 23 (FIG. 8). The yoke at its upper or rearward end is shaped in the general form of an "H" providing upper and lower channels 24 and 24a which extend laterally of the support when the clamp member is supported on the base panel. When the clamp member is erected, the channel 24 opens through the top of the yoke and the channel 24a opens through the bottom of the yoke. In the erected position, the arm has a plurality of vertical notches 25 which are spaced apart lengthwise of the yoke. At the outer end of the channels, a thin plate 26 extends rearwardly from the yoke and is designed to move outwardly over the upper ears 14 when the arms are moved to spread or extended position.

Figures 2, 3:
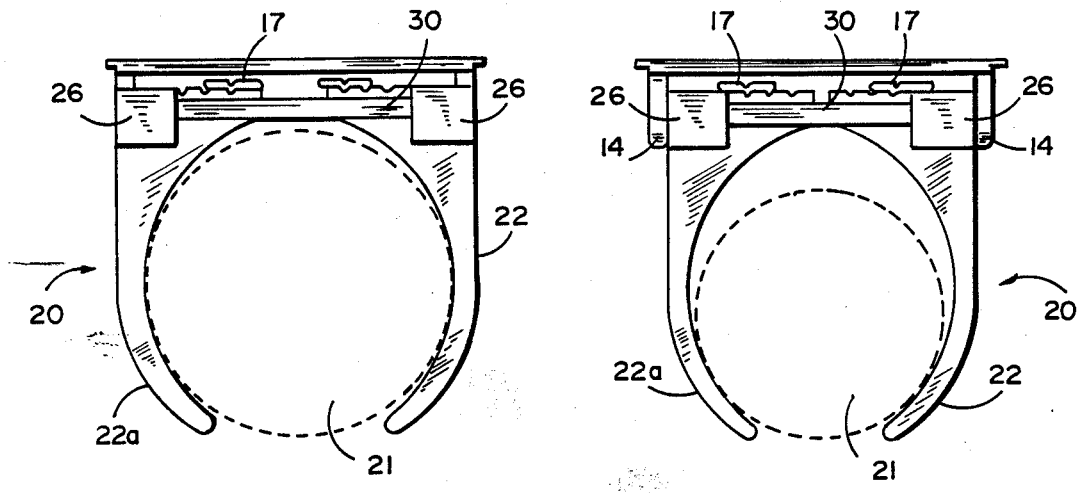
FIG. 2 is a top plan view of the erected clamp of the holder in contracted position.
FIG. 3 is a view similar to FIG. 2 showing the erected container clamp in expanded condition.
Figure 12:
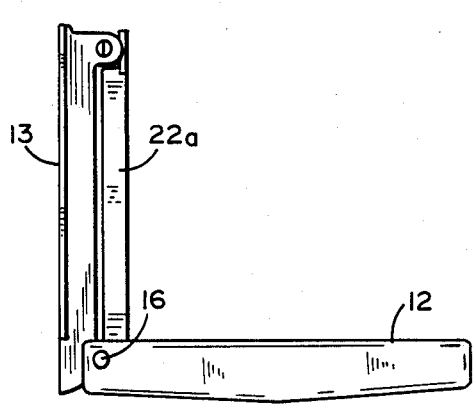
FIG. 12 is a side elevation view of the invention with the cover in open position.
Figure 10:
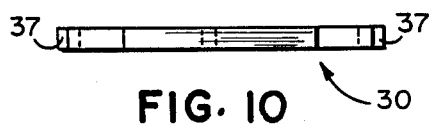
FIG. 10 is a side view of the track illustrated in FIG. 9.
Figure 5:
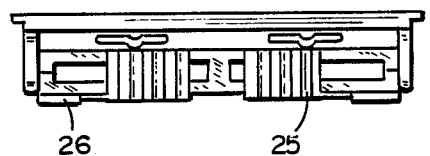
FIG. 5 is a top plan view of the invention with the clamp retracted and folded.
Figure 9:
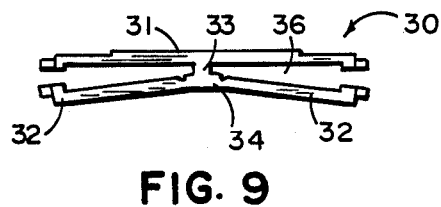
FIG. 9 is a plan view of the track for the clamp arms.
Figure 6:
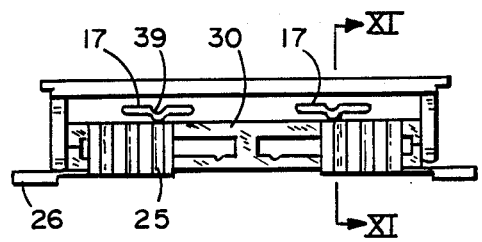
FIG. 6 is a view similar to FIG. 5 but with the clamp expanded.
Figure 7:
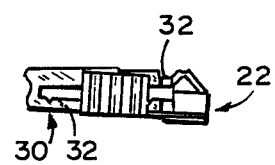
FIG. 7 is an enlarged, fragmentary view illustrating the assembly of one of the clamp arms to the track element.
Figure 4:
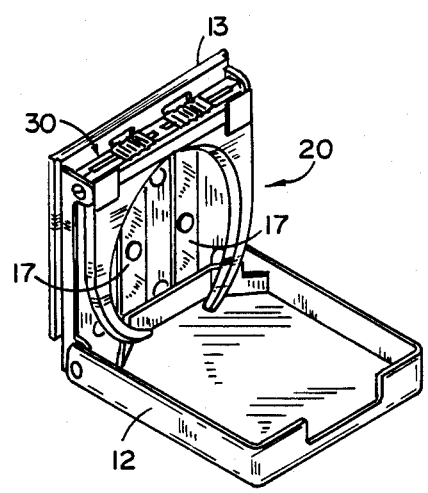
FIG. 4 is an oblique view similar to FIG. 1 but illustrating the clamp folded into storage position.
Figure 11:
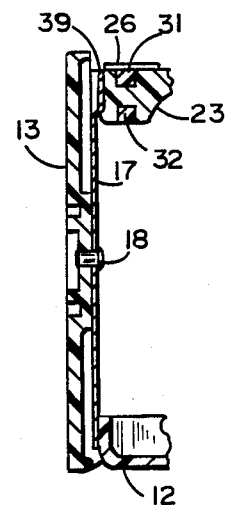
FIG. 11 is a sectional elevation view taken along the plane X—X of FIG. 7.

Both yokes are supported on a track element 30. The track element 30 is an elongated member which, as best seen in FIGS. 9 and 10, consists of a first leg 31 and a pair of second legs 32. The first leg 31 has a pair of sections which are designed to remain rigidly aligned axially on each side of the center portion 33 which connects the first and second legs. The second legs 32 are designed to be capable of being flexed out of alignment due to the presence of a shallow notch 34 adjacent the center portion 33. The lateral ends of the legs 31 and 32 have portions which extend toward each other to maintain the legs parallel to each other when the unit is operative and to assure the formation of slot 36 on each side of the center portion 33 which is of uniform width throughout its length. The ends of the legs 31 and 32 have extensions which form pintles 37 extending outwardly at each end. These pintles are split to provide access to the slots 36 as illustrated in FIG. 7. However, when the legs 32 are aligned parallel with the legs 31, the portions of each of the pintles form a circular element which seats in the openings 38 in the upper ears 14 of the back panel. To assemble the arms and the track element, the legs 32 are pivoted just enough to allow the cross piece 27 which separates the channels 24 and 24a of the yoke to be seated in one of the channels 36. When this has been done, the legs 32 are pivoted back to closed position and, by flexing the upper ears outwardly sufficiently, the pintles 37 are seated in the openings 38 in the upper ears (FIG. 12). When the clamp member is pivoted downwardly into retracted position, the upper ends of the springs 17 are pressed against the back face of the yoke and the back face of the track element, as the same is seen in FIGS. 5 and 6, thus, biasing the clamp member to remain in retracted position. When, however, the clamp member is pivoted to erected position, the notches 25 become aligned with the springs and, thus, detents 39 in the springs will each seat in one of the notches, as is illustrated in FIGS. 2 and 3. Thus, as the individual arms of the clamping member are shifted outwardly, various ones of the notches 25 on each of the yoke will successively be brought into register with the spring detents 39, providing a positive resistance to further lateral movement of the individual clamp member. Thus, the positions of the clamp members once established will remain fixed until an operator provides positive pressure to adjust the spacing between the arms. The outward and inward movement of the arms is limited to the length of the slots 36 formed between the legs of the track element. The support or holder is designed to be mounted against a vertical surface by means of screws or the like inserted through the openings 19. This can be done while the article holder is in open condition as illustrated in FIG. 1. When the article holder is not in use, the support member 20 is retracted to a vertical position parallel with the back panel and seated between the sides 13 extending forwardly from the back panel, as seen in FIG. 4. The cover 12 is then pivoted upwardly to enclose the folded clamping member as illustrated in FIG. 13.

To make the unit operable, the cover is povited to the position illustrated in FIGS. 4 and 12. Then the clamp member 20 is pivoted to its erected position illustrated in FIG. 1. In this condition, the arms 22 and 22a of the clamp member will be retracted so that they will fit within the confines of the cover 12. If the container or article to be supported by the unit is small, it is simply seated through the opening 21 between the arms 22 and 22a to rest on the base formed by the open cover 12. If, however, the container is larger, the arms 22 and 22a are spread apart the distance necessary to permit the container to be passed downwardly between them. The cooperation of the notches 25 with the detents 39 will hold the relative positions of the arm with sufficient resistance to movement that the container will be positively held against any substantial sideways movement or release from the holder. It will be recognized that while the unit has been described and illustrated with only 3 notches on each of the arms, additional notches may be provided to either provide more precise spacing between the arms or to make it possible to have an even greater degree of adjustment than the 3 notches would permit. The back panel 11, the cover 12, the arms 22 and 22a and the track element 30 can all be molded from a suitable plastic which will provide enough strength to positively hold a container filled with liquid, be resistant to the presence of moisture and sunlight and will provide surfaces which will not gall when one part is moved relative to another. The material must also have enough resilience to permit the upper and lower ears 14 and 15 to be spread just enough to permit the pintles of the clamp member and the cover to be seated in their respective openings. A suitable material is a reinforced polyamide, such as nylon. By making the whole unit foldable, the entire unit can be folded substantially flat against the sides of a vessel such as a boat where it will not interfere with operation of the vessel when it is not in use and, further, will protect it from accidential damage due to somebody striking the unit while it is open.

While a preferred embodiment of the invention has been described, it will be recognized that various modifications of the unit can be made. Each of such modifications is to be considered as included in the hereinafter appended claims unless these claims by their language expressly state otherwise.

We claim:

1. An article holder mountable on an upwardly extending surface, said holder having a back panel adapted to seat against and be supported by the surface, a base panel pivotally connected to the lower end of said back panel for pivotal movement between an open position extending outwardly from said back panel substantially normal thereto and a closed portion overlying said back panel, a clamp member for engaging and holding a beverage container, said clamp member being pivotally secured to the upper end of said back panel for pivotal movement between a storage position generally parallel to said back panel and an erected position generally parallel to said base panel, the improvement in said support comprising: an elongated track element having means at each end rotatably securing said track element to said back panel; said clamp member having a pair of arms, said arms being independent of each other, one end of each of said arms slidably engaging and supported by said track member whereby each of said arms can be independently moved lengthwise of said track element for adjusting the size of the opening between said arms.

2. An article holder mountable on an upwardly extending surface, said holder having a back panel adapted to seat against and be supported by the surface, base means extending outwardly from the lower end of said back panel substantially normal thereto, hinge means joining said panels, an elongated track element mounted on and extending transversely across the front of said back panel adjacent the top thereof, a clamp member; said clamp member having a pair of arms each independently moveable with respect to the other, each of said arms having a yoke portion engaging said track element for slidable movement therealong, whereby the spacing between said arms can be adjusted, resilient means providing limited resistance to movement of said arms toward and away from each other whereby said arms will positively hold a container placed between them, said track element at each of its ends being pivotally secured to the end of said panel at the end thereof remote from said hinge means whereby said clamp can be pivoted to a position parallel to said back panel for storage.

3. An article holder as described in claim 2 wherein said resilient means is a pair of spring elements each having a detent therein for engaging one of said arms, each of said arms having detent engaging notches at spaced intervals for holding the arms at each of several selected positions along said track element.

4. An article holder as described in claim 2 wherein said track member is rectangular and has a central slot extending lengthwise thereof and each of said yoke members has means slidably seated in said slot for holding said arms in fixed rotational relationship to said track member.

5. An article holder as described in claim 4 wherein said track member has a pintle at each end, a pair of outwardly extending ears integral with said back panel each having an opening for rotatably receiving one of said pintles therein to pivotally support said track element and clamp member.

6. An article holder as described in claim 2 wherein said track element is bifurcated at each end, with each end having a pair of normally parallel legs joined at the mid-portion of the track element by a center post, a first leg of each pair being aligned with a first leg of the other pair and being rigidly joined to said center post, the second leg of each pair being joined to said center post for povital movement toward and away from the first leg adjacent thereto, said yoke portion of each of said clamp members being H-shaped in cross section with the legs of the "H" seated against the front and back faces of the track element when the clamp member is in erected position and the bar portion of the "H" is seated between the first and second legs for supporting the clamp members in fixed rotational position with respect to said track element 7. An article holder as described in claim 6 wherein said track element has a pintle at each end for rotatably supporting it, each of said pintles being split in an axial direction whereby said second legs may be pivoted away from the adjacent first leg to permit the bar portion of the clamp member's "H" shape to be seated in the slot between the first and second legs.

8. An article holder mountable on a supporting surface, said holder having a pair of panels, a hinge connected to said panels at one end for pivotal movement between a closed generally parallel relationship to each other and an open position in which one panel is generally vertical and the other generally horizontal, a clamp member pivotally connected to the panel which is vertical when the holder is open at the end thereof remote from said hinge for movement between a storage position parallel to the panel to which it is connected and a service position parallel to the other of said panels, the improvement in said holder comprising: a track element pivotally mounted at its ends to the panel which is vertical when the holder is open at the end thereof remote from said hinge for pivotal movement of said clamp member between a position parallel to the panel to which the track member is mounted and one normal thereto; said clamp member having a pair of arms, said arms being independent of each other, one end of each of said arms slidably engaging and supported by said track member whereby each of said arms can be independently moved lengthwise of said track element for adjusting the size of the opening formed between them.

9. The article holder described in claim 8 wherein each of said arms has a yoke portion seated against said track element, resilient means engaging said yoke portion to provide limited resistance to movement of the arms toward and away from each other whereby said arms will positively hold a container placed between them.

10. An article holder as described in claim 9 wherein said resilient means is a pair of spring elements each having a detent therein for engaging one of said arms, each of said arms having detent engaging notches at spaced intervals for holding the arms at each of several selected positions along said track element.

11. An article holder as described in claim 9 wherein said track member is rectangular and has a central slot extending lengthwise thereof and each of said yoke members has means slidably seated in said slot for holding said arms in fixed rotational relationship to said track member.

12. An article holder as described in claim 9 wherein said track element is bifurcated at each end, with each end having a pair of normally parallel legs joined at the mid-portion of the yoke member by a center post, a first leg of each pair being aligned with a first leg of the other pair and being rigidly joined to said center post, the second leg of each pair being joined to said center post for pivotal movement toward and away from the first leg adjacent thereto, said yoke portion of each of said clamp members being H-shaped in cross section with the legs of the "H" seated against the front and back faces of the track element when the clamp member is in erected position and the bar portion of the "H" is seated between the first and second legs for supporting the clamp members in fixed rotational position with respect to said track element.

13. An article holder as described in claim 12 wherein said track element has a pintle at each end for rotatably supporting it, each of said pintles being split in an axial direction whereby each of said second legs may be pivoted away from the adjacent first leg to permit the bar portion of the clamp member's "H" shape to be seated in the slot between the first and second legs.

* * * * *